United States Patent [19]
Blanding

[11] Patent Number: 6,166,759
[45] Date of Patent: Dec. 26, 2000

[54] BENT SMILE CORRECTOR

[75] Inventor: Douglass L. Blanding, Rochester, N.Y.

[73] Assignee: Eastman Kodak Company, Rochester, N.Y.

[21] Appl. No.: 09/056,494

[22] Filed: Apr. 7, 1998

[51] Int. Cl.[7] .................................. B41J 2/46; G02B 7/02
[52] U.S. Cl. ............................................ 347/242; 359/811
[58] Field of Search ..................................... 347/242, 240, 347/241, 244, 243, 246, 245; 359/811, 818, 819, 820, 821, 822; 355/1; 385/116, 119

[56] References Cited

U.S. PATENT DOCUMENTS

| | | | |
|---|---|---|---|
| 4,427,284 | 1/1984 | Dannatt | 355/1 |
| 4,804,975 | 2/1989 | Yip . | |
| 5,521,748 | 5/1996 | Sarraf . | |
| 5,745,153 | 4/1998 | Kessler et al. | 347/241 |
| 5,841,463 | 11/1998 | Debesis et al. | 347/242 |
| 5,854,651 | 12/1998 | Kessler et al. | 347/241 |

FOREIGN PATENT DOCUMENTS 4-52151  2/1992  Japan ................................ B41J 2/44

*Primary Examiner*—David F. Yockey
*Attorney, Agent, or Firm*—Milton S. Sales

[57] ABSTRACT

An optical apparatus for correcting deviations from straightness of an array of laser emitters includes an array of laser emitters in generally aligned positions along an array direction. The positions of the emitters deviating from a straight, array direction line in a cross-array direction perpendicular to the array direction by a generally simple bend. Each laser emitter produces a beam of light in a direction normal to the array and the cross-array directions such that the light beams travel along individual light beam paths. A corrector device in the light beam paths aligns the light beam paths in a cross-array direction, thereby correcting for any deviation of the laser emitters from the straight, array direction line of the laser emitters. The corrector device includes a flexible fiber lens formed in a predetermined shape corresponding to the simple bend positions of the emitters, and a mechanical mount to which the lens is attached and which is flexibly adjustable to thereby effect forming the lens into the predetermined shape.

5 Claims, 7 Drawing Sheets

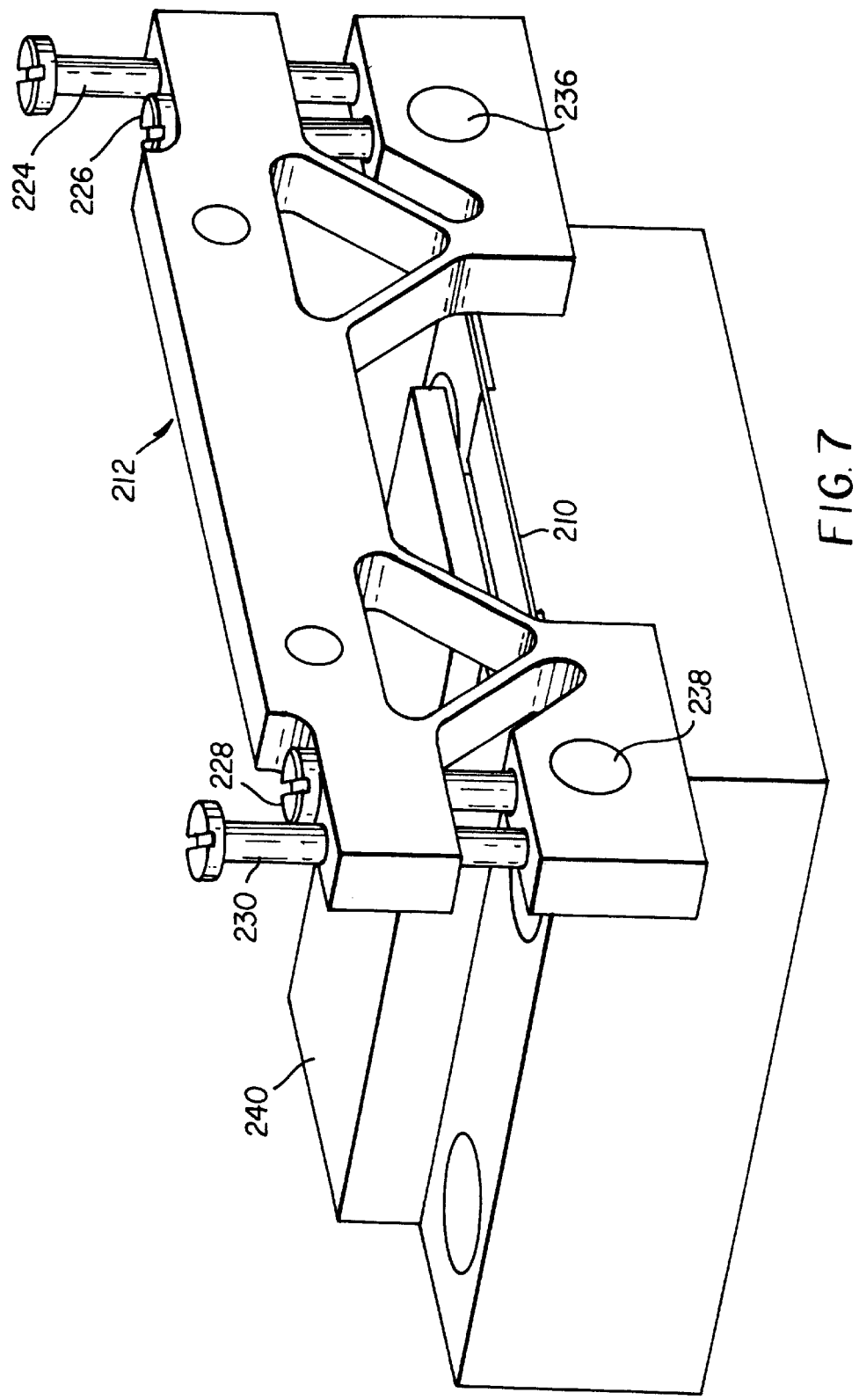

BENT SMILE CORRECTOR

CROSS REFERENCE TO RELATED APPLICATIONS

Reference is made to commonly assigned, co-pending U.S. patent applications Ser. No. 07/986,207, filed in the names of Kessler et al. on Dec. 7, 1992, Ser. No. 09/078,333, abandoned entitled PRECISION ASSEMBLY TECHNIQUE filed in my name, and Ser. No. 08/659,469, U.S. Pat. No. 5,854,651 filed in the names of Kessler et al. on May 31, 1996.

FIELD OF THE INVENTION

The present invention relates generally to linear arrays of laser emitters used in printers to expose photosensitive media, thermally sensitive media, and the like.

BACKGROUND OF THE INVENTION

In laser printers, the optical power of lasers is used to affect the media. The printing can take place on dye transfer media, ablation media, photo resist media, or any other photosensitive media. High power is needed to enhance the printing speed of laser thermal printers. One technique for achieving high power in a laser thermal printer is to use a monolithic array of diode laser emitters.

A laser array consists of an array of emitters arranged on a line which is typically 10 mm long. Each emitter in the array has an emitting aperture length between about 4 microns to 200 microns in the direction along the line of emitters (herein called the "array direction"). In the cross-array direction, which is perpendicular to the array direction, the emitting apertures are only 0.5 micron to 1 micron wide.

U.S. Pat. No. 4,804,975, which issued to K. Yip on Feb. 14, 1989, discloses a thermal dye transfer apparatus which includes such a monolithic array of diode laser emitters that illuminate a dye carrying donor medium. The donor medium absorbs the heat from the laser light, and the dye is transferred from the donor medium to the receiving member. The diode laser emitters in the array are independently modulated. When the array of laser emitters is directly imaged in such a system onto the media, cross-array emitter position errors are transferred to the media.

In such an application, it is important to have the printing spots lie on a well defined line. Otherwise, artifacts will be introduced into the document. FIG. 1 shows an array of spots tilted by an angle α on a medium wrapped around a drum. Raster lines 10, 12, 14, and 16 are formed from the spots. Spots 18 and 20 are on an acceptable line, while spot 22 is displaced from its desired position.

In this case the array of printing spots is tilted by angle α to provide raster lines 10, 12, 14, etc. with a predetermined pitch. The deviation of printing spot 22 from a straight line results in an axial displacement of its raster line along the printing drum. This uneven spacing of the raster lines is a source of printing artifacts such as the one called "banding." If the printing head is not tilted such that α=0, the deviations from straightness can be cured electronically for a particular writing plane by using different time delays for each of the printing spots. However, when the medium surface is shifted from this particular plane (such as by the use of a receiver sheet of different thickness), the delays may need to be adjusted, or the position errors will be evident. It is thus important in multi-spot laser printers to have the printing spots lie on a straight line and to preserve this straightness over a certain depth of focus along the optical axis.

Typically, the printing spots are created by an optical system which makes a magnified image of the laser emitters. A normal laser diode emitter in the array has an aperture of approximately 4 microns to 200 microns in the array direction by 0.5 micron to 1 micron in the cross-array direction. Printing spots ordinarily may lie in a range from about 5 microns to about 50 microns in size: so the optical system will need to produce a magnification from 10× to 100×.

Some laser manufacturing processes result in laser emitters having displacements from a perfect line. The magnitude of these errors can easily be 5 microns, which is much larger than the spot itself. With the optical system magnifying the spots by such a large amount in the cross-array direction as described above, the displacement error is also magnified by the same amount. This causes a large displacement of the printing spots compared to the actual spot dimension. Printing with such a non-straight line of spots will not produce acceptable images. The perpendicular deviations of the laser emitters from an ideal line are referred to herein as "cross-array emitter position" errors.

There is however a way to optically correct for this laser displacement error and to provide a straight line of printing spots at the media, even in the presence of significant cross-array emitter position errors. This method is based on imaging in the cross-array direction of the far field of the laser (a plane very far from the laser) onto the media instead of imaging the laser itself (the near field). This method can be understood by observing that, in the far field, the beams will spread and become large. As shown in FIG. 2, a lenslet array 27 with lenses distinct from each other in the array direction images at the far field. Any emitter deviations from straightness of several microns in the cross-array direction become small compared to the beam size, and one can say that, in the far field, the beams lie on a substantially straight line because the cross-array emitter position errors are small compared the beam sizes.

The far field can be brought to a finite distance with the use of a lens with power in the cross-array direction. FIG. 3 shows a section of a laser diode array in the cross-array direction. Laser emitters 24 and 26 are displaced due to cross-array emitter position error. A lens 28 is placed at a distance of $f_{28}$ from the emitter. The far field is found at the back focal plane (the second principal focus) 30 of lens 28. At the back focal plane, the array is therefore straight. However the beams from the different laser emitters emerge from this plane at different angles. The cross-array emitter position errors are transformed into angular errors. If the cross-array emitter position error for say emitter 24 is e, then the angular error at plane 30 is given simply by $e/f_{28}$.

Another way to describe the straightening of the array at the back focal plane of the lens 28 is to note that the rays at the center of the beams from the different laser emitters of the array all start perpendicular to the emitting surface so they are all parallel to each other. It is well known that parallel rays entering a lens will intersect at the back focal plane of the lens; thus the emitter array is straightened at this plane because the center rays of the laser emitters intersect there. The back focal plane can then be imaged by other optics onto the media with the printing spots forming a straight line.

Commonly assigned, co-pending U.S. patent application Ser. No. 07/986,207, filed in the names of Kessler et al. on Dec. 7, 1992, discloses a monolithic array where each of the diode laser emitters in the array is independently modulated, and lenslets are used to closely pack the printing spots at the media. In this application, the cross-array emitter position errors are corrected by imaging the far field of the laser emitters onto the media in the cross-array direction.

Commonly assigned U.S. Pat. No. 5,521,748 issued to Saraff on May 28, 1996, discloses the use of diode laser arrays to illuminate an array of spatial modulators, which are then imaged onto the receiver medium to produce an array of printing spots. In a printer of this kind, it is common to mix the light from the laser emitters in the array so as to provide improved illumination uniformity at the modulator and to protect against a defective or a dead emitter in the array affecting the print. To avoid light losses at the spatial modulators, one should have a straight magnified emitter image at the modulators. This can be accomplished with the method disclosed in afore-mentioned application Ser. No. 07/986,207, U.S. Pat. No. 5,745,153 by making the modulator geometrically conjugate to the far field of the laser emitters in the cross-array direction of the beam.

In applications requiring high power throughput such as a thermal dye transfer process as disclosed in application Ser. No. 07/986,207, it is not sufficient to have a straight line of printing spots at an image receiver medium. While the back focal plane imaging technique shown in FIG. 3 produces a straight line of spots, it does not completely compensate for cross-array emitter position errors. As can be seen from FIG. 3, the cross-array emitter position errors are converted into angular errors of the beams after back focal plane 30. These angular errors may be further increased as the light progresses down the optical system. If the angular errors become too large, light loss may result, and the power throughput reduced by an unacceptable amount.

This light loss is more apparent in the system using modulators disclosed in U.S. Pat. No. 5,521,748. In this system, the back focal plane of the first lens is imaged onto a modulator, which can be envisioned as an array of apertures. When such a back focal plane is imaged onto a modulator with a reduced magnification, the angular errors of the beams at the modulator are magnified. This fact must be so to preserve the Langrange Invariant. Magnified angular errors place a larger burden on the following lens numerical aperture, which must be enough to accept these magnified angles. Otherwise the optical system after such a modulator will vignette light from laser emitters which have large cross-array emitter position errors.

Even if the light beams pass through a post modulator optical system unvignetted, the depth of focus at an image receiving medium will be smaller than that achieved with no cross-array emitter position errors. The focal depth is reduced because, when large beam angles enter an image receiving medium, the increased spreading of the light causes printing spots to grow to an unacceptable size with a smaller focal shift.

Hence, uncorrected cross-array emitter position errors have at least the following three adverse effects: (1) a non-straight line of printing spots, (2) light losses by vignetting of the beams, and (3) reduced focal depth at the printing medium making the system more difficult to manufacture. Thus, the prior art does not provide means for fully correcting the non straightness of the diode laser array.

Commonly assigned, co-pending U.S. patent applications Ser. No. 08/659,469 filed in the names of Kessler et al. on May 31, 1996, provided a correction of the cross-array position errors of emitters of a straight array so that the performance of a printhead will be essentially equivalent to the performance achieved with a straight emitter array without cross-array position errors at more than one plane and which reduces the Lagrange Invariant of the laser array in a cross-array direction. In that disclosure, the cross-array emitter position errors and the angular errors of the emitter array were removed by use of tilted plane parallel plates or lenslets components with displacements or tilts to shift beams passing through each component. In one disclosed embodiment, shown here in FIG. 4, cross-array emitter position error of a laser diode array 32 is corrected by bending a cylindrical cross-sectional fiber lens in correspondence to emitters 34 to 38 of laser diode array 32. Portions of the fiber lens are displaced in the cross-array direction by an amount equal to the cross-array emitter position errors. The beams at the fiber lens are much larger than the beam sizes at the emitters. For example, using the formula for the focal length "f":

$$f = nD/4(n-1),$$

where "D" is the diameter of the fiber lens and "n" is the index of refraction of the fiber lens, the focal length is 93 microns when the fiber lens is 140 micron diameter fiber (D equals 140 microns) and the index of refraction "n" equals 1.6. The beam size "S" at the fiber is given by:

$$S = f*2*\sin(Q/2)$$

where Q is the full width at half the maximum divergence of the emitter in the cross-array direction. For full width at half the maximum equal 30°, the beam size at the fiber lens is therefore 48 microns. The displacements are commonly quite small, on the order of 5 microns. If the fiber lens has a diameter of, say, 140 microns, it can be flexible enough to allow an 800 microns long segment to be pushed up or down by about 5 microns.

DISCLOSURE OF THE INVENTION

According to the present invention, I have determined that in actual practice, the shape of non-straight laser emitter arrays is usually a simple bend, with the ends turned either upwardly (so called, a "smile"), downwardly (so called a "frown"), or upwardly at one end and downwardly at the other end. Only very rarely is the shape of the emitter array a complex and undulating curve as suggested by FIG. 4.

Accordingly, it is an object of the present invention to provide a very simple mechanical device for correcting the cross-array position errors of an emitter array where the cross-array position errors form a simple bend with the ends turned either upwardly in a "smile", downwardly in a "frown", or upwardly at one end and downwardly at the other end so that the performance of a printhead will be essentially equivalent to the performance achieved with a straight emitter array without cross-array position errors.

According to a feature of the present invention, an optical apparatus for correcting deviations from straightness of an array of laser emitters includes an array of laser emitters in generally aligned positions along an array direction. The positions of the emitters deviating from a straight, array direction line in a cross-array direction perpendicular to the array direction by a generally simple bend. Each laser emitter produces a beam of light in a direction normal to the array and the cross-array directions such that the light beams travel along individual light beam paths. A corrector device in the light beam paths aligns the light beam paths in a cross-array direction, thereby correcting for any deviation of the laser emitters from the straight, array direction line of the laser emitters. The corrector device includes a flexible fiber lens formed in a predetermined shape corresponding to the simple bend positions of the emitters, and a mechanical mount to which the lens is attached and which is flexibly adjustable to thereby effect forming the lens into the predetermined shape.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 7 is a schematic perspective view of the device of FIG. 5 assembled to a laser emitter.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
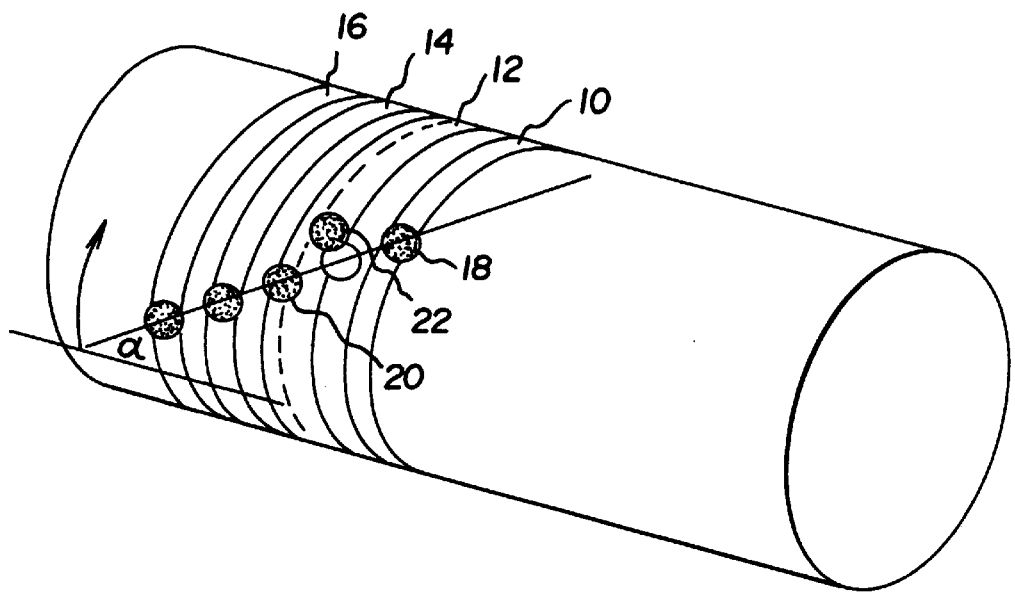
FIG. 1 is a view of a printing drum imaged by a laser emitter array according to the prior art.
Figure 2:
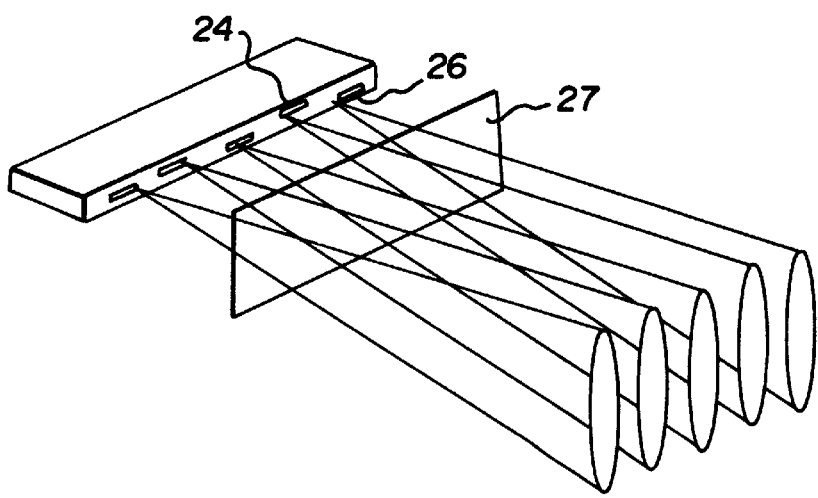
FIG. 2 is a perspective view of a laser and its far field according to the prior art.
Figure 3:
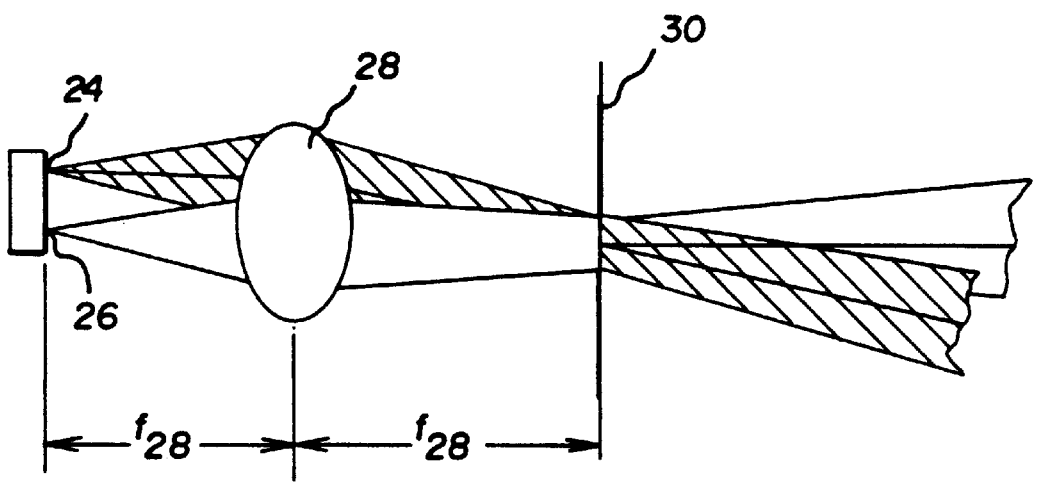
FIG. 3 is a side sectional view of laser straightening in the cross-array direction at the back focal plane of a lens according to the prior art.
Figure 4:
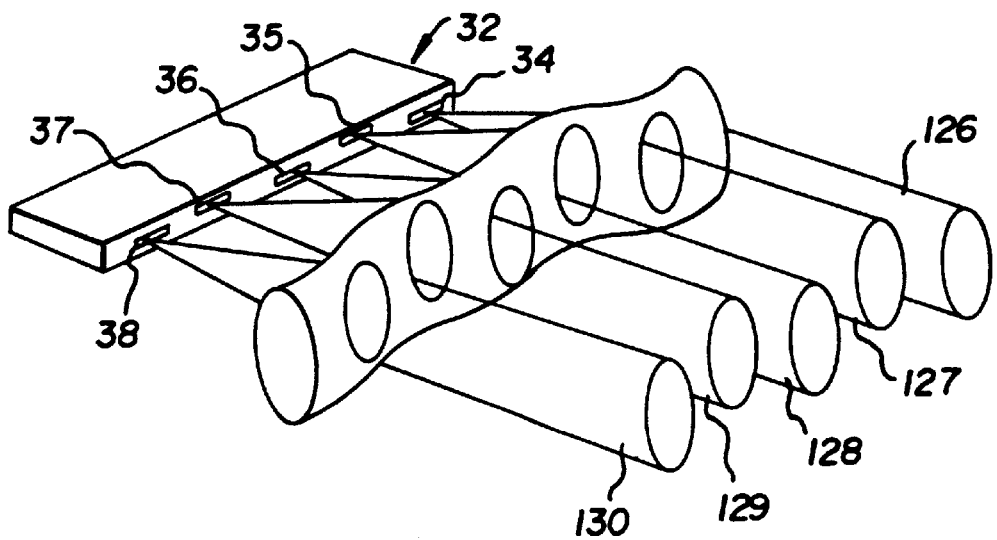
FIG. 4 is a schematic perspective view of a device for correcting a non-straight laser array according to an embodiment of the disclosure of commonly assigned, co-pending U.S. patent applications Ser. No. 08/659,469.
Figure 5:
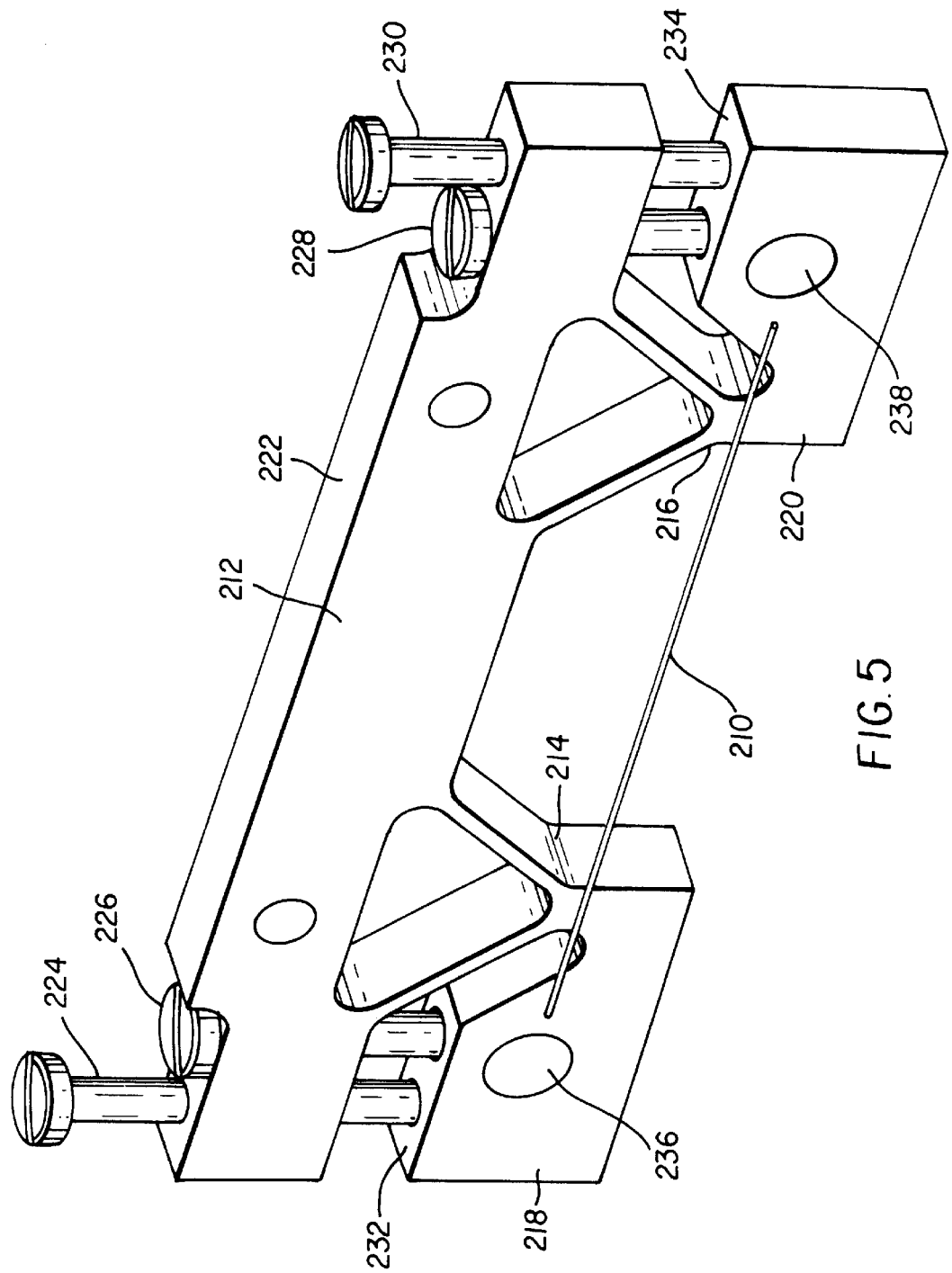
FIG. 5 is a schematic perspective view of a device for shaping a fiber lens for use in correcting a non-straight laser array according to the present invention.
Figure 6A:
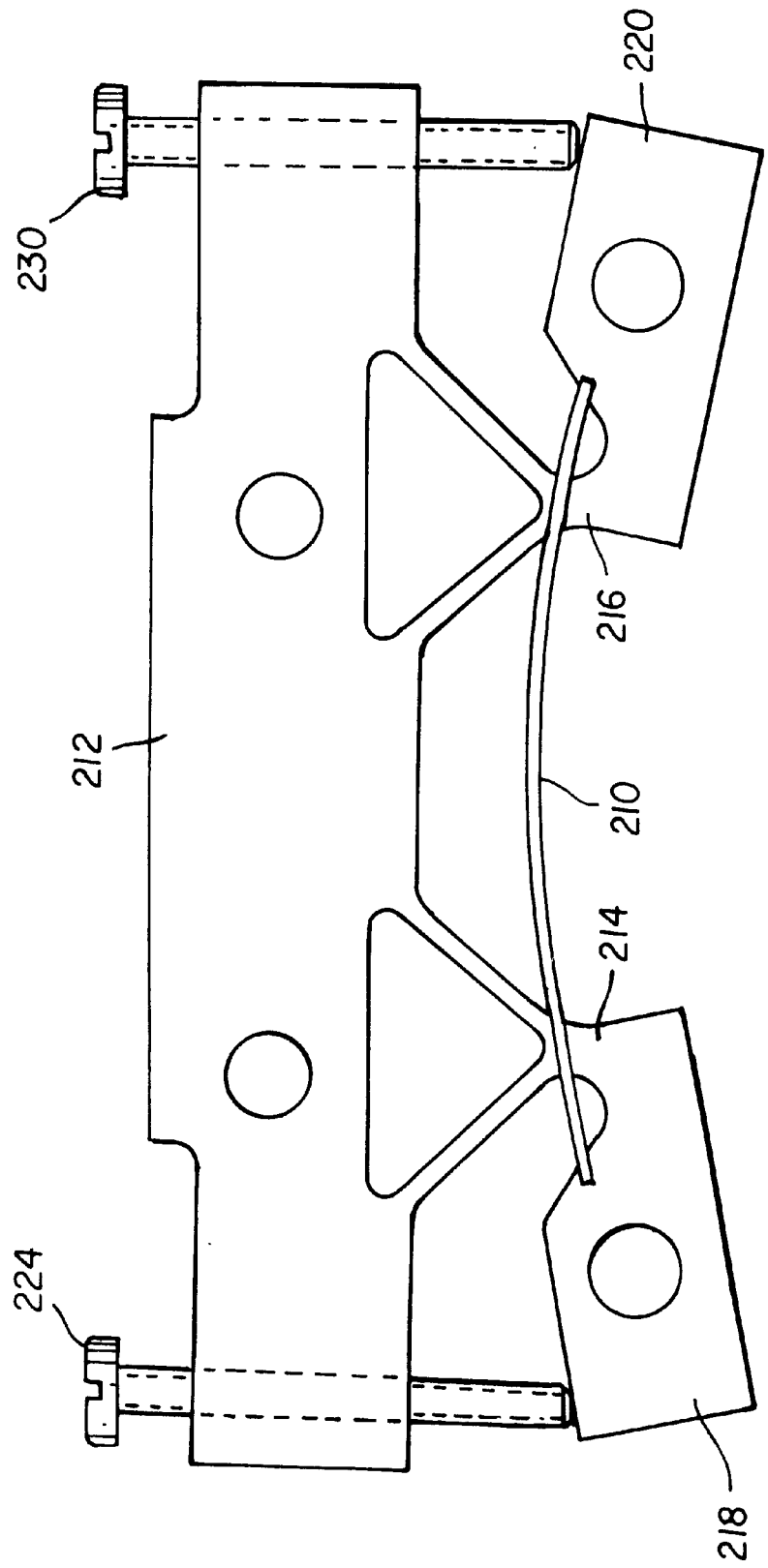
FIGS. 6A, 6B, and 6C are side schematic views of the device of FIG. 5 respectively showing opposed fiber lens shapes for correcting non-straight laser arrays according to the present invention.
Figure 6B:
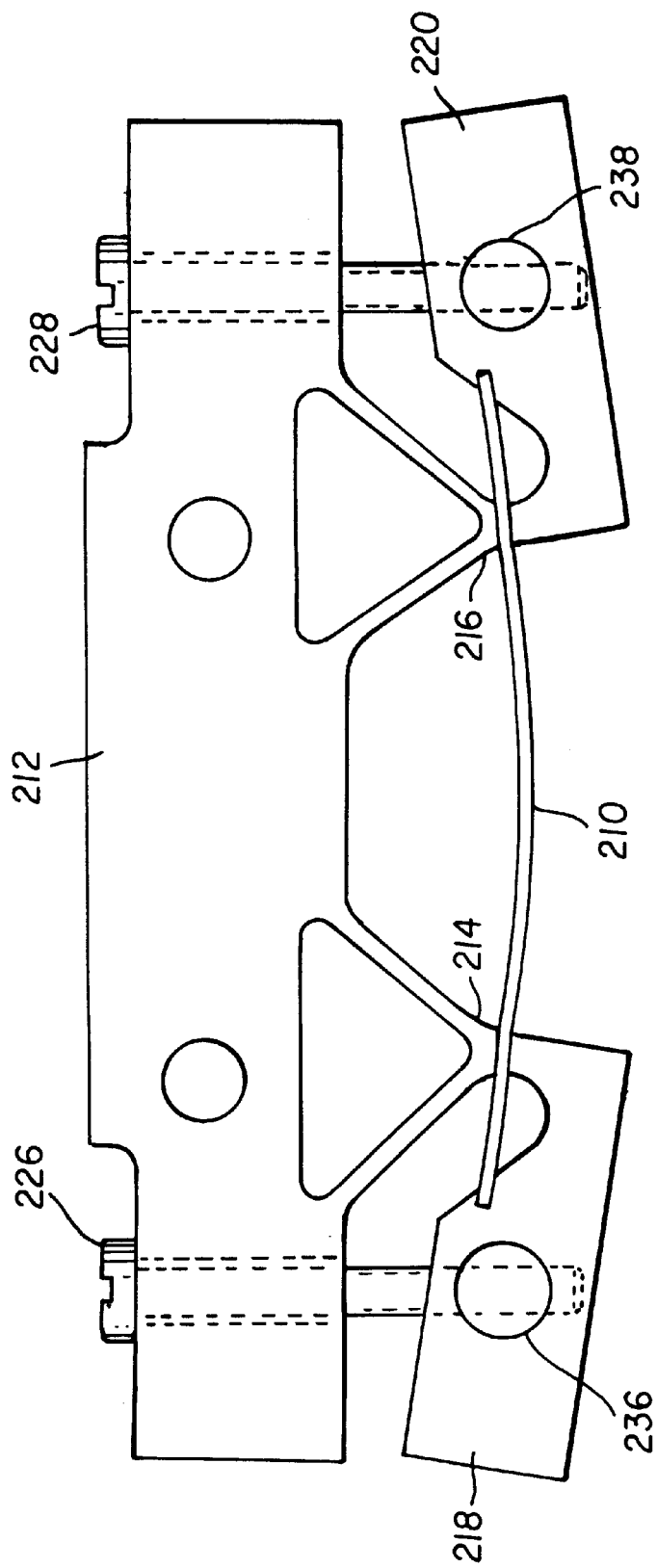
Figure 6C:
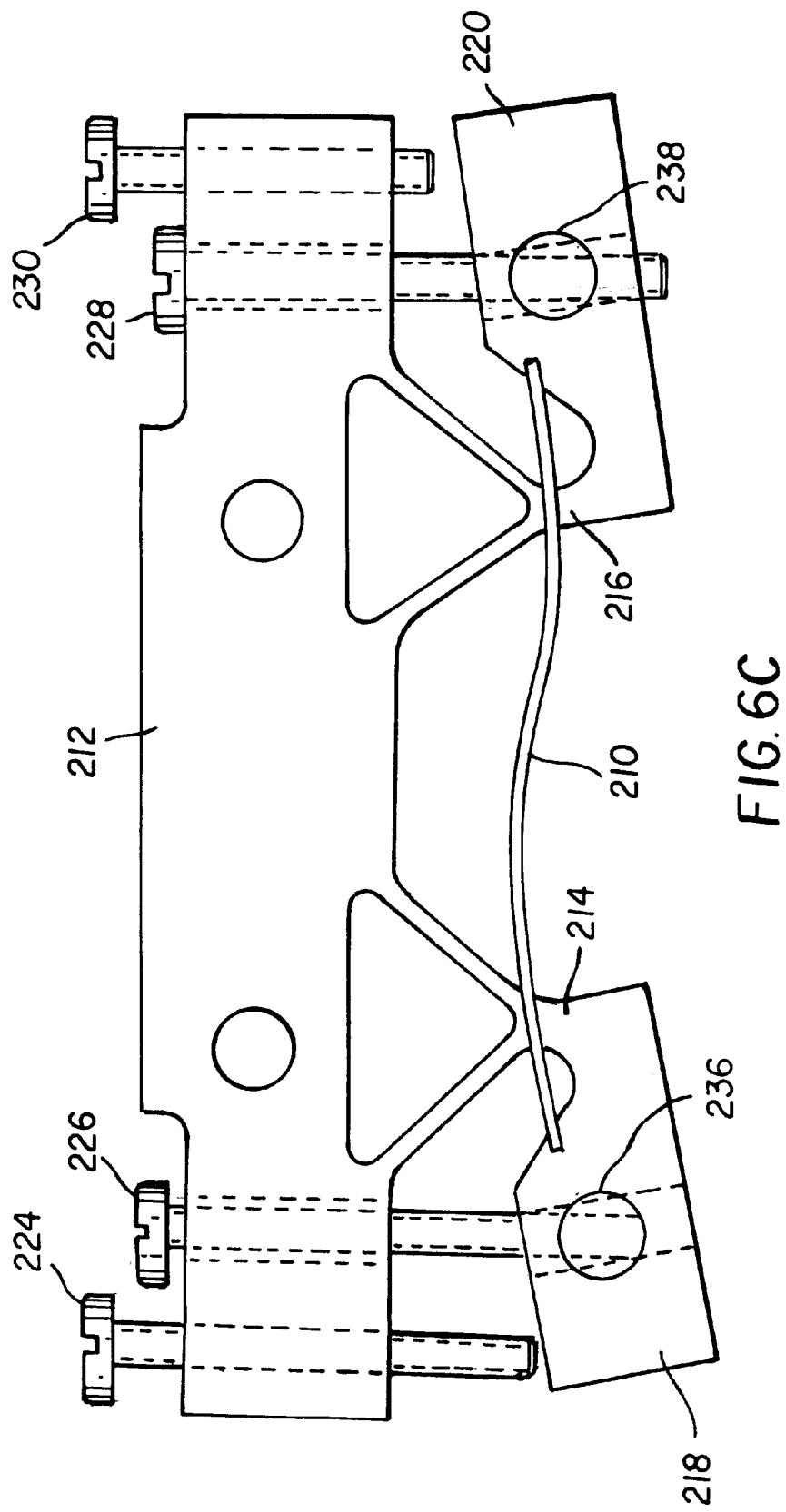

Referring to FIG. 5, a cylindrical cross-sectional fiber lens 210 is glued to a mechanical mount 212 which is shaped such that it can be bent slightly in order to cause fiber lens 210 to also bend as suggested in FIGS. 6A, 6B, and 6C. Of course, the amount of bend is grossly exaggerated in the drawings. Fiber lens 210 can be a fiber lens with a round cross section; a VPS lens, which is made by Blue Sky company and has an hyperbolic front surface; or what is called a Doric lens, which is a fiber lens with a gradient index made by Doric Lenses Inc.

Mechanical mount 212 has a pair of flex regions 214 and 216 whereat a pair of mounting blocks 218 and 220 are flexibly attached to a central rigid member 222, respectively. The ends of fiber lens 210 are rigidly attached to blocks 218 and 220.

Central rigid member 222 has four holes, each of which receives one of four adjustment screws 224, 226, 228, and 230. The outer holes that receive screws 224 and 230 are threaded, while the inner holes that receive screws 226 and 228 are smooth bored. Screws 224 and 230 push against top surfaces 232 and 234, respectively, of mounting blocks 218 and 220 as the screws are tightened, causing mechanical mount 212 to bend at flex regions 214 and 216 in such a way that fiber lens 210 assumes a convex down shape as illustrated in FIG. 6A.

Screws 226 and 228 are threaded into respective nuts 236 and 238. FIG. 6B shows the result of tightening screws 226 and 228, causing mechanical mount 212 to bend at flex regions 214 and 216 in such a way that fiber lens 210 assumes a convex up shape.

During factory manufacture and assembly, the required shape of fiber lens 210 is determined and set using the adjusting screws as just described. The fiber lens and mechanical mount 212 are then positioned in front of a laser array 240 as shown in FIG. 7 and attached, such as by example the method disclosed in my commonly assigned co-pending patent application entitled PRECISION ASSEMBLY TECHNIQUE. Accordingly, the cross-array position errors of an emitter array where the cross-array position errors form a simple bend with the ends turned either upwardly in a "smile" or downwardly in a "frown" are corrected so that the performance of the printhead will be essentially equivalent to the performance achieved with a straight emitter array without cross-array position errors.

Advantages of the Invention

The current invention provides full correction of the cross-array emitter placement errors of laser emitters of a laser bar so that the performance of a printing head will be essentially equivalent to the performance achieved with a perfectly straight emitter array. This correction goes beyond methods which only provide a straight array only at one plane. The presently disclosed invention will greatly reduce light losses and provide maximum depth of focus.

The invention has been described in detail with particular reference to preferred embodiments thereof, but it will be understood that variations and modifications can be effected within the spirit and scope of the invention.

What is claimed is:

1. An optical apparatus for correcting deviations from straightness of an array of laser emitters, said apparatus comprising:

an array of laser emitters in generally aligned positions along an array direction, the positions of the emitters deviating from a straight, array direction line in a cross-array direction perpendicular to the array direction by a generally simple bend, each laser emitter producing a beam of light in a direction normal to the array and the cross-array directions such that the light beams travel along individual light beam paths; and a corrector device in the light beam paths for aligning the light beam paths in a cross-array direction, thereby to correct for any deviation of the laser emitters from the straight, array direction line of the laser emitters, said corrector device including a flexible fiber lens formed in a predetermined shape corresponding to the positions of the emitters which deviate from a straight, array direction line in a cross-array direction perpendicular to the array direction by a generally simple bend, and a mechanical mount to which the lens is attached and which is flexibly adjustable to thereby effect forming the lens into the predetermined shape;

wherein the mechanical mount has pair of mounting blocks separated by at least one flex region; and the fiber lens has two attachment regions spaced-apart in the array direction and attached to respective ones of the mounting blocks.

2. An optical apparatus as set forth in claim 1 further comprising a mechanical screw adjuster actuatable to bend the mechanical mount about the flex region to thereby form the lens into the predetermined shape.

3. An optical apparatus for correcting deviations from straightness of an array of laser emitters, said apparatus comprising:

an array of laser emitters in generally aligned positions along an array direction, the positions of the emitters deviating from a straight, array direction line in a cross-array direction perpendicular to the array direction by a generally simple bend, each laser emitter producing a beam of light in a direction normal to the array and the cross-array directions such that the light beams travel along individual light beam paths; and a corrector device in the light beam paths for aligning the light beam paths in a cross-array direction, thereby to correct for any deviation of the laser emitters from the straight, array direction line of the laser emitters, said corrector device including a flexible fiber lens formed in a predetermined shape corresponding to the positions of the emitters which deviate from a straight, array direction line in a cross-array direction perpendicular to the array direction by a generally simple bend, and a mechanical mount to which the lens is attached and which is flexibly adjustable to thereby effect forming the lens into the predetermined shape;

wherein the mechanical mount has central rigid member and pair of mounting blocks attached to opposing ends of the central rigid member by respective flex regions; and the fiber lens has two attachment regions spaced-apart in the array direction and attached to respective ones of the mounting blocks.

4. An optical apparatus as set forth in claim 3 further comprising a mechanical screw adjuster actuatable to move the mounting blocks relative to the central rigid member by flexing the flex regions to thereby form the lens into the predetermined shape.

5. An optical apparatus for correcting deviations from straightness of an array of laser emitters, said apparatus comprising:

an array of laser emitters in generally aligned positions along an array direction, the positions of the emitters deviating from a straight, array direction line in a cross-array direction perpendicular to the array direction by a generally simple bend, each laser emitter producing a beam of light in a direction normal to the array and the cross-array directions such that the light beams travel along individual light beam paths; and a corrector device in the light beam paths for aligning the light beam paths in a cross-array direction, thereby to correct for any deviation of the laser emitters from the straight, array direction line of the laser emitters, said corrector device including a flexible fiber lens formed in a predetermined shape corresponding to the positions of the emitters which deviate from a straight, array direction line in a cross-array direction perpendicular to the array direction by a bend such that the array is turned upwardly at one end and downwardly at the other end, and a mechanical mount to which only the ends of the lens are attached and which is flexibly adjustable to thereby effect forming the lens into the predetermined shape.

* * * * *